United States Patent [19]
Dam et al.

[11] Patent Number: 5,601,061
[45] Date of Patent: Feb. 11, 1997

[54] ENGINE INTAKE AIR DEFLECTOR

[75] Inventors: Chuong Q. Dam; Kerry A. Delvecchio, both of Peoria, Ill.; Martin L. Willi, West Lafayette, Ind.

[73] Assignee: Caterpillar Inc., Peoria, Ill.

[21] Appl. No.: 648,737

[22] Filed: May 16, 1996

[51] Int. Cl.⁶ ..................................................... F02B 3/00
[52] U.S. Cl. ................ 123/298; 123/188.8; 123/142.5 E
[58] Field of Search .................................. 123/306, 661, 123/188.8, 298, 142.5 E, 308

[56] References Cited

U.S. PATENT DOCUMENTS

| | | | |
|---|---|---|---|
| 2,058,487 | 10/1936 | Mock | 123/298 |
| 3,640,261 | 2/1972 | Josey | 123/188.8 |
| 4,475,030 | 10/1984 | Bailey | 219/270 |
| 4,721,081 | 1/1988 | Krauja et al. | 123/298 |
| 4,756,281 | 7/1988 | Chen et al. | 123/188.8 |
| 5,146,881 | 9/1992 | Pfefferle | 123/145 |

FOREIGN PATENT DOCUMENTS

| | | | |
|---|---|---|---|
| 49075 | 10/1982 | European Pat. Off. | 123/188.8 |
| 2042236 | 3/1978 | Germany | 123/298 |
| 99705 | 4/1990 | Japan | 123/188.8 |

*Primary Examiner*—Erick R. Solis
*Attorney, Agent, or Firm*—Alan J. Hickman

[57] ABSTRACT

An apparatus disposed in the combustion chamber of an internal combustion chamber reduces the cooling affect of intake air directly impinging upon a heating device in the combustion chamber and increases the life of the heating element.

17 Claims, 2 Drawing Sheets

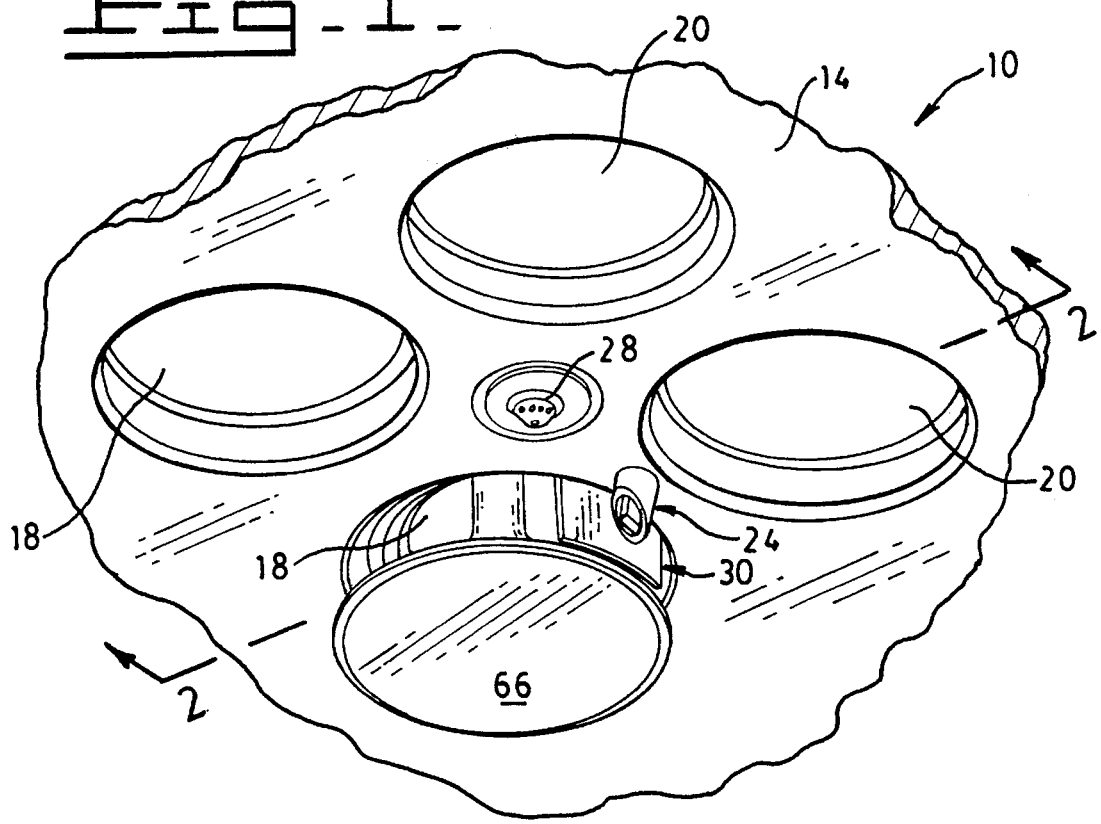
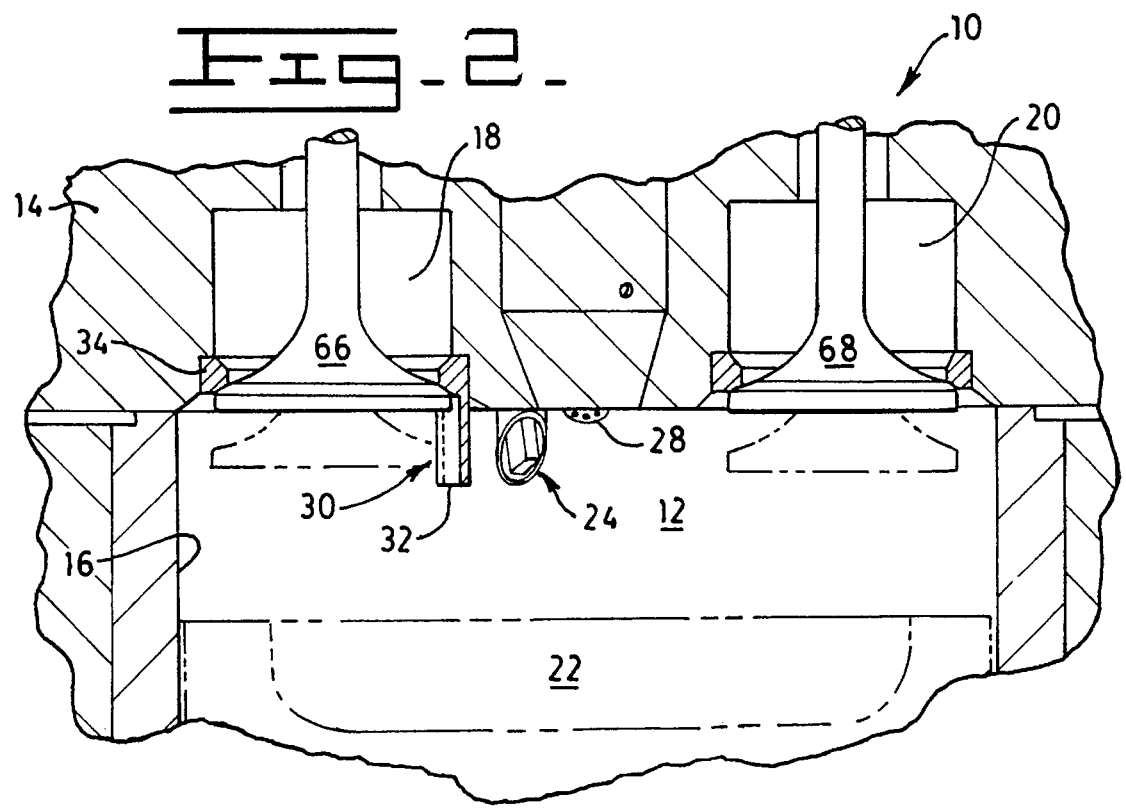

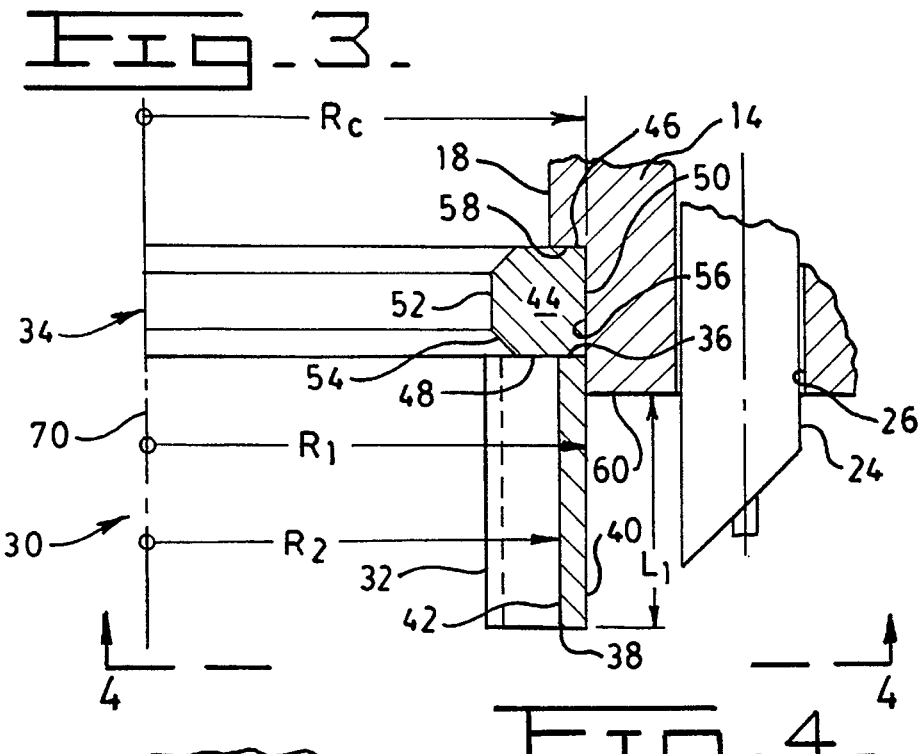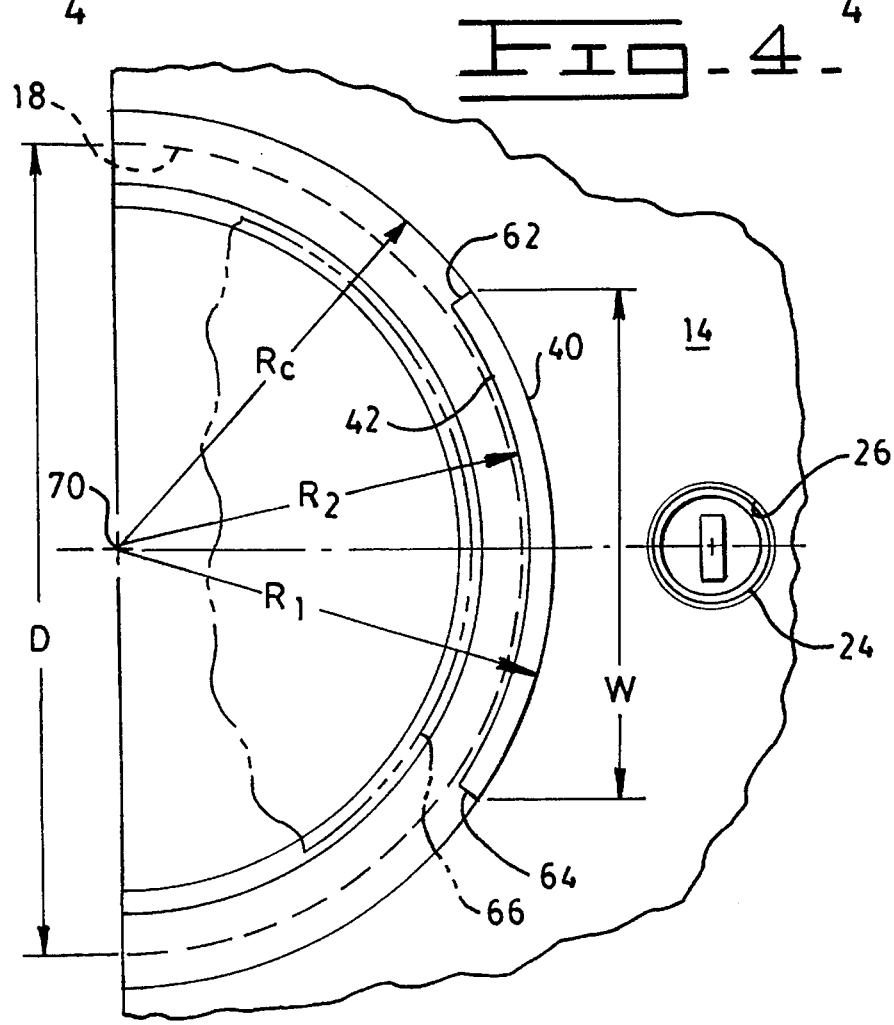

ENGINE INTAKE AIR DEFLECTOR

TECHNICAL FIELD

This invention relates to an apparatus for shielding air in a combustion chamber of an ignition assisted engine and more particularly to a deflector disposed in a combustion chamber of an internal combustion engine at a location between a heating device and an air intake opening for maintaining intake air entering the combustion chamber from directly impinging on the heating element.

Background Art

Internal combustion engines and particularly diesel engines are more difficult to stare than automotive type gasoline engines in cold starting or arctic conditions. Electrically heated glow plugs have been successful in raising the temperature in the combustion chamber so that ignition may occur easily under cold starting conditions. Due to the high temperatures the life of a glow plug tends to be relatively short requiring frequent servicing and replacement.

Catalyst coated electrically heated glow plugs have been tried to improve cold starting performance of diesel engines. After the initial electrical heating of the glow plug it is said that the present plug temperature is maintained by exothermic catalytic reactions after termination of electrical glow plug heating during starting. The catalytic coated glow plug raises the temperature above a non-coated glow plug and above that required for ignition. This hotter environment does not increase glow plug life and therefore premature failure is eminent.

Attempts have been made to reduce the temperature of combustion by changing compression ratios, catalysts, fuel types, and glow plug ignition control. These attempts have made some minor improvements, however, the life of a glow plug has not increased enough to consider the problem solved.

During investigation of the problem it was determined that cooling of the glow plug occurred during the intake stroke. Further, study of the problem resulted in recognizing that when the intake valve(s) opens the inrush of air through the intake port into the combustion chamber impinges on the heating device. This contact of fresh air is believed to cool the heating device surface temperature and cause large temperature fluctuations of the heating device. These conditions generate a waste of electrical energy to the heating device when of the electrically heated type. These fluctuations also reduce the efficiency of the heating device and requires adjustments in size, fuel and the like.

The present invention is directed to overcoming one or more of the problems as set forth above.

Disclosure of the Invention

In one aspect of the present invention, an internal combustion engine has a combustion chamber, a cylinder head, a cylinder, an air intake port disposed in the head and opening into the combustion chamber and a heating device disposed in the combustion chamber. A deflector is disposed in the combustion chamber at a preselected location between the heating device and the air intake port. The deflector is of a size sufficient for diverting the flow of intake air from directly imping on and reducing the temperature of the heating device. A supporting member connects the deflector to the head and maintains the deflector at the preselected location.

In another aspect of the present invention, an apparatus for diverting the flow of intake air from directly imping on a heating device disposed within a combustion chamber of an internal combustion engine is provided. The apparatus has ring with first and second spaced sides, a cylindrical outer surface and a bore disposed therein. The ring is adapted for being pressed into a counterbore associated with an intake port of the engine. The apparatus also has a deflector with opposed first and second ends and first and second spaced arcuate surfaces. The deflector is connected at the first end to the second side of the ring and extends therefrom transverse the second side.

BRIEF DESCRIPTION OF THE DRAWINGS

FIG. 1 is a diagrammatic isometric view of an embodiment of the present invention showing a portion of a cylinder head with a deflecting apparatus located between a heating device and an intake valve;

FIG. 2 is a diagrammatic crossectional view of a combustion chamber taken along lines 2—2 of FIG. 1;

FIG. 3 is an enlarged diagrammatic crossectional view of the deflecting apparatus installed in the cylinder head;

FIG. 4 is a diagrammatic view taken along lines 4—4 of FIG. 3.

BEST MODE FOR CARRYING OUT THE INVENTION

With reference to the drawings, and particularly FIGS. 1 and 2, an internal combustion engine 10, such as a diesel or alternative fuel engine, has a combustion chamber 12, a cylinder head 14, a cylinder 16, and an air intake port 18 and exhaust port 20 disposed in the head and opening into the combustion chamber 12. It is to be noted that one or more intake and exhaust ports 18,20 may be provided for each of a plurality of cylinders 16 without departing from the spirit of the invention. A piston 22, slidably movable in the cylinder 16, defines the combustion chamber 12 between the piston 22 and cylinder head 14.

A heating device 24, such as a glow plug assembly with or without a catalytic coating, a catalytic coated rod assembly that is not electrically heated, an electrode assembly such as a spark plug and the like is disposed in the combustion chamber 12 at a proselected location relative to the intake port 18. The catalytic coating may be of any suitable material such as a base metal oxide or other equivalent. The heating device 24 is preferably connected to the cylinder head 14 and enters the combustion chamber 12 through an aperture 26 (FIGS. 3 and 4) in the cylinder head 14. The heating device 24 is provided to assist in the ignition of fuel introduced into the cylinder, for example, by a fuel injection nozzle 28 located in the combustion chamber 12.

An apparatus 30 diverts the flow of intake air from directly impinging on the heating device 24. The apparatus 30 has a deflector 32 disposed in the combustion chamber 12 at a proselected location between the heating device 24 and the air intake port 18. The deflector 32 is associated with the intake port 18 closest the heating device 24 for obvious reasons. However, a deflector 32 may also be disposed between another intake port 18 and the heating device 24 without departing from the spirit of the invention. The deflector 32 is of a size sufficient for diverting the flow of intake air from directly imping on and reducing the temperature of the heating device 24. The apparatus is constructed of a metallic material, for example steel, capable of withstanding the temperature and explosive environment associated with a combustion chamber 12. However, other materials such as ceramics are considered equivalents and within the spirit of the invention.

As best seen in FIGS. 2 and 3, a supporting member 34 connects the deflector 32 to the cylinder head 14 and maintains the deflector 32 at the preselected location between the intake port 18 and the heating device 24. In the particular embodiment of the present invention shown, the deflector 32 resembles an airfoil having opposed first and second ends 36,38 and first and second spaced arcuate surfaces 40,42.

The supporting member 34 includes a ring 44 having first and second spaced substantially sides 46,48, a cylindrical outer surface 50, a bore 52 disposed therethrough and a tapered portion 54. The ring 44 is disposed in a counterbore 56 in the cylinder head 14. The counterbore 56 and the intake port 18 are substantially concentric. The ring 44 is maintained in the counterbore 56 by any suitable mechanical fastening method, for example, such as by pressing.

The counterbore 56 has a step flange 58. The first side 46 of ring 44 is engaged with the step flange 58 and the deflector 32 is connected to the second side 48 of the ring. The depth of the step flange 58 establishes the magnitude of extension of the deflector 32 into the combustion chamber 12.

The deflector 32 is connected at the first end 36 to the second side 48 of the ring 48 and extends therefrom transverse to the second side 48. The distance from the step surface 58 to a surface 60 of the cylinder head 14, the distance between the first and second sides 46,48 of the ring 44, and the distance between the first and second sides 36,38 of the deflector 32 establishes the predetermined distance "L" of extension of the deflector into the combustion chamber. Since the piston 22 is slidably moveable in the cylinder 16 and relative to the cylinder head 14 between top and bottom dead center positions, the distance "L" of extension is smaller in magnitude than the distance between the cylinder head 14 and the piston 22 at top dead center. The amount of clearance between the piston 22 and the end 38 of the deflector 32 is large enough to prevent interference but small enough to prevent an excessive amount of airflow to pass over the end 38.

It is to be noted that there are other ways of attaching the deflector 32 to the cylinder head 14 than discussed above, for example, by welding, bonding, and other machanical methods including threaded fasteners and the like, without departing from the spirit of the invention.

As best seen in FIG. 4, the deflector 32 has a predetermined width "W" as measured across first and second opposite sides 62,64. The width "W" is determined as a function of the distance between the intake port 18 and the heating device 24, the distance between deflector 32 and the heating device 24, and the amount of intake air deflection required to maintain the temperature of the heating device 24 substantially constant during engine operation. The magnitude of the width "W" is less than the diameter "D" as measured across the intake port 18.

The first and second spaced arcuate surfaces 40,42 of the deflector 32 are defined by predetermined spaced first and second radii of curvature $R_1, R_2$. The first radius of curvature $R_1$ is substantially equal in magnitude to a radius of curvature $R_c$ defining the cylindrical outer surface 50 of the ring 44. The second radius of curvature $R_2$ is smaller in magnitude that the first radius of curvature $R_1$ and defines the thickness of the deflector 32. As can be seen, the first and second arcuate surfaces 40,42 and the outer cylindrical surface of the ring 44 share a common axis 70 about which the radii $R_1, R_2$ and $R_c$ are disposed. This axis 70 is also common with the axis of the intake port 18.

Referring to FIG. 2, the intake and exhaust ports 18,20 have associate therewith an intake and exhaust valve 66,68, respectively. The valves 66,68 are axially disposed in their respective ports 18,20 and axially movable for opening and closing the ports 18,20. The intake valve 66 engages the tapered portion 54 of the ring 54 at the closed position of the intake valve 66 and seals the combustion chamber 12 from the intake port. Thus, the tapered portion provides a valve seat for the intake valve 66.

Industrial Applicability

With reference to the drawings, and particularly FIG. 2, as the piston 22 cycles between bottom and top dead center positions of operation the intake and exhaust valves 66,68 axially move between open and closed positions relative to the intake and exhaust ports 18,20. The intake valves 66 are open during at least a portion of the intake stroke of the piston 22 to allow air into the chamber 12 for subsequent compression and combustion purposes. The timing of the valve 66,68 opening and piston 22 movement is well know in the art and will not be discussed in any detail.

The heating device 24, as previously discussed, assists in the combustion of the fuel/air mixture in the combustion chamber 12 by preheating the chamber and raising the temperature therein so that combustion occurs at the proper time near top dead center of the piston and during the expansion stroke. The deflector 32, being positioned in the combustion chamber 12 between the intake port 18 and the heating device 24, deflects air entering the combustion chamber 12 through the intake port 18 and prevents such air from directly impinging on and cooling the heating device 24. By maintaining the surface temperature of the heating device at a hotter temperature, the combustion process in the chamber 12 will be easier and more complete.

Alternatively, and particularly in the case of an electrically heated heating device 24, the deflector 32 enables the surface of the heating device 24 to be maintained at a more constant temperature with less power. This results in the heating device 24 being maintained at a lower surface temperature without sacrificing combustion. As a result the life of the heating device is extended and less energy is used.

As indicated earlier, the size and number of deflectors 32 affects the amount of cooling of the heating device 24 during the intake stroke. As one may perceive, to many deflectors 24 or excessively large deflectors may affect the distribution of air/fuel and thus combustion. It is therefore important that the size and number of deflectors 24 are carefully selected so that optimum combustion is obtained.

Other aspects, objects and advantages of this invention can be obtained from a study of the drawings, the disclosure and the appended claims.

We claim:

1. An internal combustion engine having a combustion chamber, a cylinder head, a cylinder, an air intake port disposed in said head and opening into the combustion chamber, and a heating device disposed in the combustion chamber, comprising:

a deflector disposed in the combustion chamber at a preselected location between the heating device and air intake port, said deflector being of a size sufficient for diverting the flow of intake air from directly impinging on and reducing the temperature of the heating device;

a supporting member connecting the deflector to said head and maintaining said deflector at said preselected location.

2. An internal combustion engine, as set forth in claim 1, wherein said air intake port has a preselected diameter, said deflector having predetermined width less than the diameter of said intake port.

3. An internal combustion engine, as set forth in claim 1, wherein said engine has a piston, said piston being movable to a preselected spaced clearance distance from said head at a top dead center position of said piston, said deflector extending into said cylinder a preselected distance, said preselected distance of extension of said deflector being smaller in magnitude than the magnitude of said clearance distance between the piston and head.

4. An internal combustion engine, as set forth in claim 3 where in said deflector has an arcuate shape.

5. An internal combustion engine, as set forth in claim 3 wherein said deflector is a metallic material.

6. An internal combustion engine, as set forth in claim 1, wherein said head has a counter bore disposed therein, said counter bore being substantially concentric with said intake port, said support member including a ring disposed in said counterbore.

7. An internal combustion engine, as set forth in claim 6, wherein said ring being pressed in said counterbore.

8. An internal combustion engine, as set forth in claim 6, including an intake valve movably disposed in said intake port, said ring having a tapered portion, said tapered portion providing a valve seat for said intake valve.

9. An internal combustion engine, as set forth in claim 6, wherein said counterbore has a step flange and said ring has first and second spaced substantially parallel sides, said first side being engaged with the step flange and said deflector being connected to said second side.

10. An internal combustion engine, as set forth in claim 1, wherein said engine has a plurality of cylinders defining a plurality of combustion chambers with said head, each of said combustion chambers having a heating member and deflector disposed therein.

11. An internal combustion engine, as set forth in claim 1, wherein the heating member includes a glow plug.

12. An internal combustion engine, as set forth in claim 1, wherein said heating member includes an oxide catalyst.

13. An apparatus for diverting the flow of intake air from directly impinging on a heating device disposed within a combustion chamber of an internal combustion engine, comprising:

a ring having first and second spaced sides, a cylindrical outer surface and a bore disposed therein, said ring being adapted for pressing into a counterbore associated with an intake port of the engine;

a deflector having opposed first and second ends and an first and second spaced arcuate surfaces, said deflector being connected at said first end to the second side of the ring and extending therefrom transverse said second side.

14. An apparatus, as set forth in claim 13, wherein said first and second spaced arcuate surfaces being defined by predetermined spaced first and second radii of curvature, said first radius of curvature being substantially equal in magnitude to a radius defining the cylindrical outer surface of said ring.

15. An apparatus, as set forth in claim 14, wherein said first arcuate surface and said outer cylindrical surface having a common axis about which said radius defining the cylindrical outer surface and said first radius of curvature are disposed.

16. An apparatus, as set forth in claim 13, wherein said ring has a chamfered portion defining a seat for engagement by an intake valve.

17. An apparatus, as set forth in claim 14, wherein said ring and deflector are constructed of a steel material.

* * * * *